United States Patent Office 3,564,773
Patented Feb. 23, 1971

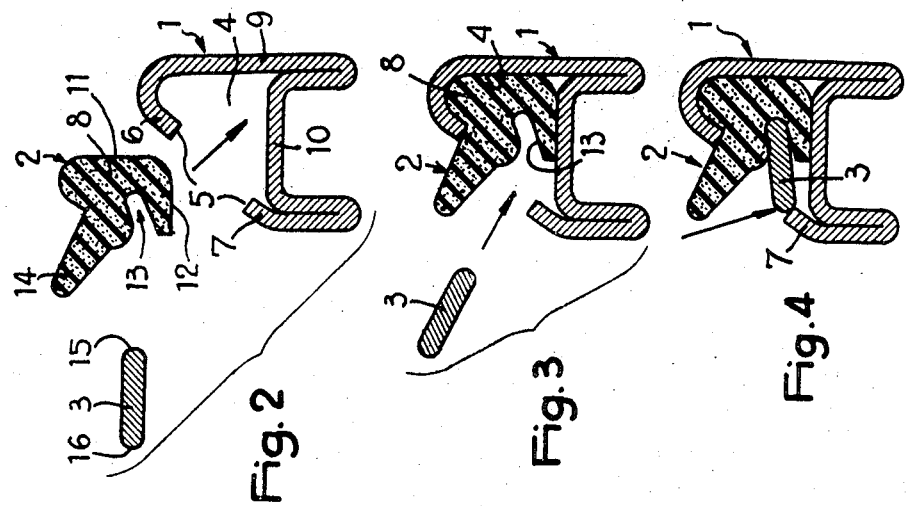
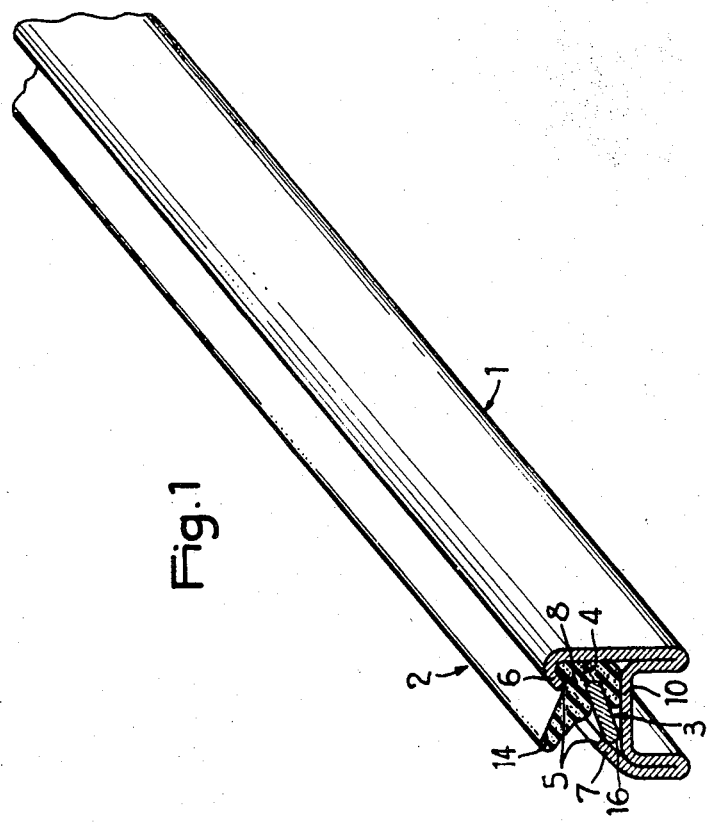

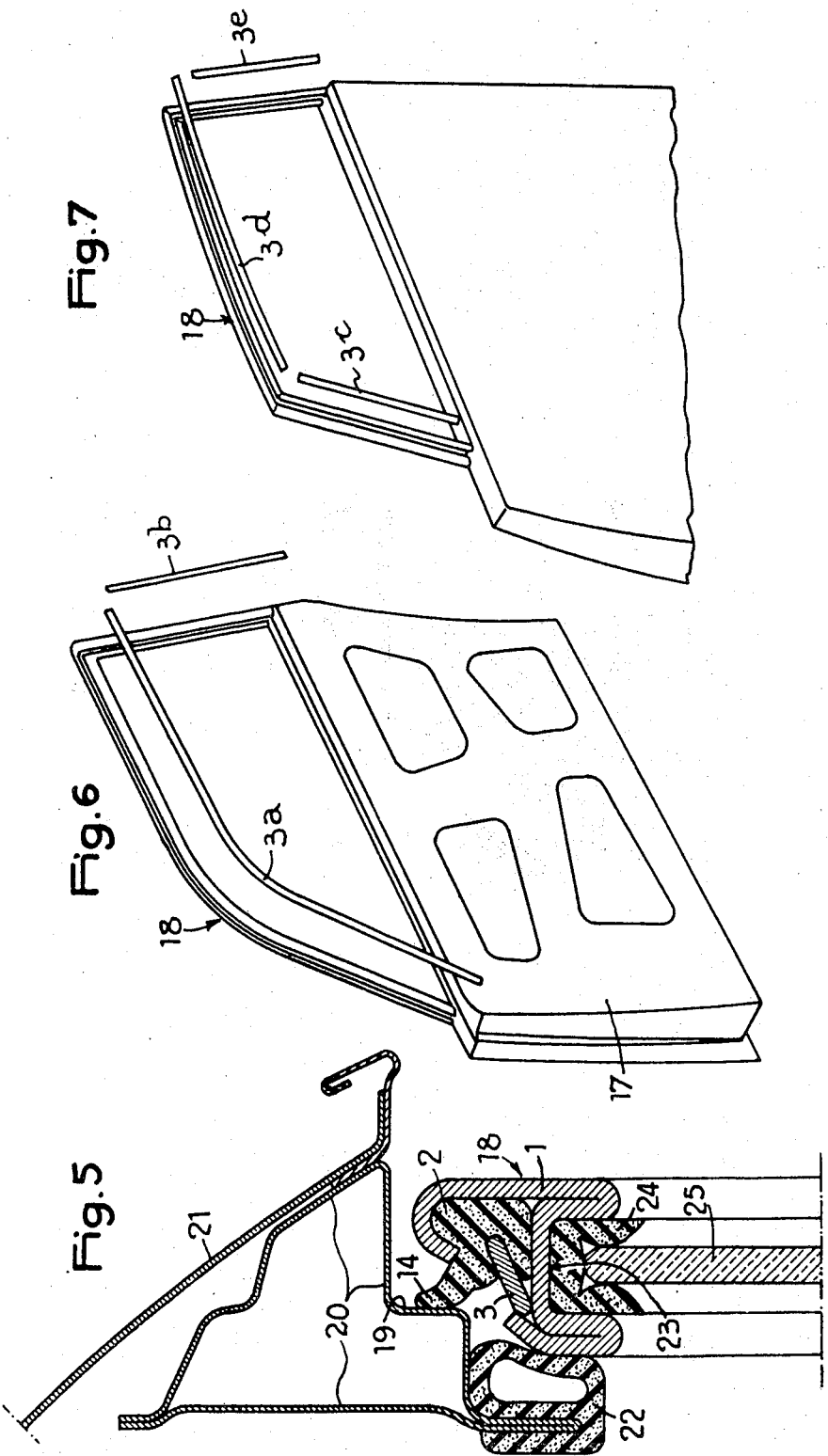

3,564,773
SEALING DEVICE FOR A CLOSING ELEMENT
Michel Bonnaud, Montbeliard, France, assignor to Automobiles Peugeot, Paris, France, and Regie Nationale des Usines Renault, Billancourt, France, both French bodies corporates
Filed Aug. 9, 1968, Ser. No. 751,495
Claims priority, application France, Sept. 21, 1967, 121,712
Int. Cl. E04b 1/66
U.S. Cl. 49—488                    3 Claims

ABSTRACT OF THE DISCLOSURE

The devices comprises a sectional support element having a recess whose entrance is a constricted and defined by two flanges. A removable sealing element having a heel portion and a lip portion is engaged in the recess by its heel portion, the lip portion extending outside the recess. A removable locking strip engages the heel portion and locks it in the recess by engagement behind one of the aforementioned flanges.

---

The present invention relates to sealing devices and more particularly, although not exclusively, to devices for automobile vehicle doors and like closing elements, comprising a sealing element of rubber or like plastic material which is applied against the edge of a frame or other opening.

In known devices, the sealing element of rubber or like plastic material, which must follow the contour, consisting of rectilinear portions and curvilinear portions, of the door or other object provided with this element, is usually fixed by adhesion or fasteners on a rigid support which has a shape corresponding to said contour.

The adhesion of the sealing elements has numerous drawbacks and in particular the following:

A clean adhesion is difficult to achieve in mass production. It is impossible to effectively adhere certain flexible materials (such as for example ethylene propylene) to sheet metal.

The adhesion is unreliable over a period of time.

As concerns fixing by fasteners, although it remedies these drawbacks, it usually has other drawbacks. In particular, it does not afford a seal between the support and the sealing element or it does not allow removal of the sealing element under good conditions.

The object of the invention is to provide an improved sealing device which remedies these various aforementioned drawbacks.

The sealing device according to the invention comprises in combination: a sectional support element having a recess the entrance of which is constricted, a removable sealing element having a heel portion engaged in said recess and a lip portion outside said recess, and a removable strip constituting a locking key for locking said heel portion in said recess by an elastically yieldable engagement of said key behind a flange of said constricted entrance of the recess of the support.

According to another feature, the heel portion of the sealing element is grooved so as to receive that edge of the key opposed to that engaged under the flange of the entrance of the recess.

Further features and advantages of the invention will be apparent from the ensuing description with reference to the accompanying drawings.

In the drawings:

FIG. 1 is a partial perspective view, partly in section, of a sealing device according to the invention;

FIGS. 2, 3 and 4 are cross-sectional views of the various elements of the device respectively before and in the course of assembly;

FIG. 5 is a cross-sectional view of an application of the sealing device as an outer seal for an automobile door, and FIGS. 6 and 7 are diagrammatic perspective views of two doors provided with the device according to the invention, the locking keys being shown in several parts before being placed in position.

In the embodiment shown in FIGS. 1-4, the sealing device comprises in combination, a sectional element acting as a support 1, a yieldable sealing element 2 of rubber or like plastic material, and a strip 3 or locking key for locking the element 2 in the support 1.

This support 1 is of metal and constructed, in the presently-described embodiment, by a folding operation. It comprises a longitudinal recess 4 having a constricted entrance 5 defined by two longitudinal ledges or flanges 6 and 7 which are partly folded over in sunch manner that their edges are in at least roughly facing relation. The recess 4 consequently has a sectional shape in the form of a right-angled triangle.

The sealing element 2 comprises (see in particular FIG. 2) a massive heel portion 8 whose shape corresponds to the portion of the section of the recess 4 defined by the flange 6 and the walls 9 and 10 of the support 1 disposed at right angles to each other, that is, by the inside of said recess. This heel portion consequently comprises two faces 11 and 12 which are at right angles to each other and, in its oblique face, a groove 13 which extends from its entrance towards its inner end in a direction away from the face 12. The heel portion 8 is extended above said groove 13 by an oblique lip portion 14 which extends towards the free end of the lip portion in a direction away from the face 12.

The strip or locking key 3 is of metal or plastics material. It has a rectangular cross-sectional shape but its longitudinal edges 15 and 16 (FIG. 2) are radiused or rounded. The thickness of the strip is slightly greater than the width of the groove 13 of the sealing element 2.

The length of the strip is such that when the strip is engaged fully in this groove by its edge 15 (FIG. 1), the other edge 16 is wedged in the corner formed by the wall 10 and the slightly formed over flange 7 of the support 1 (FIG. 1).

To assemble the device, the sealing element 2 is first engaged in the recess 4 (compare FIGS. 2 and 3) by its heel portion 8. The key 3 is then engaged in the groove 13 until it reaches the position shown in FIG. 4. Thereafter, a force is applied to this key (FIG. 4) so as to engage it under the flange 7 into the locking position shown in FIG. 1. Owing to the fact that the thickness of the key 3 is slightly greater than the width of the groove 13, the heel portion 8 is slightly compressed in the recess 4.

In the assembled position of the sealing element, the lip portion 14 is ready to perform its sealing function.

The sealing device just described can be employed, in particular although not exclusively, in an automobile door 17 (FIGS. 5-7) as an outer door seal 18, the lip portion 14 of the element 2 being adapted to bear against the face 19 of the upper sill 20 of the body of the vehicle below the roof 21, whereas the usual inner seal 22 for the door entrance abuts the support 1. The latter comprises in its recess 23 the V-shaped sealing element 24 for receiving the window 25.

The sealing device 18 according to the invention of course has a shape corresponding to the shape of the door entrance. Two shapes are shown in FIGS. 6 and 7. In the embodiment shown in FIG. 6, the locking key can be composed of two parts or sections 3a, 3b.

In the embodiment shown in FIG. 7, three sections 3c, 3d, 3e of the locking key are provided.

Although specific embodiments of the invention have been described, many modifications and changes may be made therein without departing from the scope of the invention as defined in the appended claims.

Having now described my invention, what I claim as new and desire to secure by Letters Patent is:

1. A sealing device for an automobile vehicle door or like closing element, said device comprising in combination: a sectional support element having two substantially perpendicular walls defining in cross-section a substantially triangular-shaped recess opening on one side, a flange at the end of each wall of said support element, said flanges being directed toward each other and substantially parallel and defining a constricted entrance for said recess, a removable yieldable sealing element having a heel portion engaged in said recess against said walls and behind one of said flanges and a lip portion integral with said heel portion and extending outside said recess, said heel portion defining a groove extending substantially in facing relationship with respect to the other of said flanges, and a removable strip constituting a locking key engaged in said groove and wedged behind said other flange, to lock said yieldable sealing element in said recess.

2. In an automobile vehicle door having a glass panel, a sealing device comprising a support element defining in cross-section a U-shaped recess for receiving the edge of said glass panel, said support element further defining adjacent said U-shaped recess a substantially triangular-shaped recess opened on one side and including two flanges constricting the opened side of said triangular-shaped recess, a removable yieldable sealing element having a heel portion engaged in said triangular-shaped recess behind one of said flanges and a lip portion integral with said heel portion and extending outside said triangular-shaped recess, said heel portion defining a groove extending substantially in facing relationship with respect to the other of said flanges, and a removable strip constituting a locking key, engaged in said groove and wedged behind said other flange, to lock said yieldable sealing element in said triangular-shaped recess.

3. A sealing device as claimed in claim 2, wherein said support element is composed of a folded metal sheet the edges of which are turned over to define said flanges.

References Cited

UNITED STATES PATENTS

| 1,141,188 | 6/1915 | Johnson | 52—718 |
| 2,453,343 | 11/1948 | Reilly | 52—502 |
| 3,344,573 | 10/1967 | Martin et al. | 52—502X |
| 3,445,978 | 5/1969 | Muehle | 52—402X |

FOREIGN PATENTS

| 505,960 | 5/1939 | Great Britain | 52—397 |
| 578,722 | 7/1946 | Great Britain | 52—397 |

FRANK L. ABBOTT, Primary Examiner

S. D. BURKE, Assistant Examiner

U.S. Cl. X.R.

49—490, 496; 52—397, 403